United States Patent
Amin-Sanayei et al.

(10) Patent No.: US 6,649,720 B2
(45) Date of Patent: Nov. 18, 2003

(54) ETHANE AS A CHAIN TRANSFER AGENT FOR VINYLIDENE FLUORIDE POLYMERIZATION

(75) Inventors: Ramin Amin-Sanayei, King of Prussia, PA (US); Lawrence Kyran Wempe, Upper Saucon, PA (US); Valerie Toulin, Le Mans (FR); Mehdi Durali, West Chester, PA (US)

(73) Assignee: Atofina Chemicals, Inc., Philadelphia, PA (US)

(*) Notice: Subject to any disclaimer, the term of this patent is extended or adjusted under 35 U.S.C. 154(b) by 0 days.

(21) Appl. No.: 10/040,148

(22) Filed: Jan. 2, 2002

(65) Prior Publication Data

US 2002/0147289 A1 Oct. 10, 2002

Related U.S. Application Data

(60) Provisional application No. 60/268,528, filed on Feb. 14, 2001.

(51) Int. Cl.[7] ................................................ C08F 14/18
(52) U.S. Cl. ........................ 526/255; 526/247; 526/250
(58) Field of Search ................................ 526/255, 250, 526/247

(56) References Cited

U.S. PATENT DOCUMENTS

| | | | | |
|---|---|---|---|---|
| 3,475,396 A | | 10/1969 | McCain et al. | 260/92.1 |
| 3,635,926 A | | 1/1972 | Gresham et al. | 260/87.5 |
| 3,857,827 A | | 12/1974 | Dohany | 260/92.1 |
| 4,360,652 A | | 11/1982 | Dohany | 526/210 |
| 4,569,978 A | | 2/1986 | Barber | 526/206 |
| 5,428,122 A | * | 6/1995 | Abusleme et al. | 526/209 |
| 5,473,030 A | | 12/1995 | Arcella et al. | 526/206 |
| 5,852,149 A | * | 12/1998 | Abusleme et al. | 526/247 |
| 5,919,878 A | * | 7/1999 | Brothers et al. | 526/247 |
| 6,096,795 A | * | 8/2000 | Abusleme et al. | 522/33 |
| 6,399,729 B1 | * | 6/2002 | Farnham et al. | 526/255 |

FOREIGN PATENT DOCUMENTS

| | | |
|---|---|---|
| EP | 387938 | 9/1993 |
| EP | 617058 | 9/1994 |

* cited by examiner

*Primary Examiner*—David W. Wu
*Assistant Examiner*—Henry S. Hu
(74) *Attorney, Agent, or Firm*—William D. Mitchell

(57) ABSTRACT

Vinylidene fluoride polymers are produced by using ethane as a chain transfer agent in the emulsion polymerization process. Vinylidene fluoride homopolymers made by the process have a significantly reduced tendency to generate cavities at high temperatures and a greater resistance to discoloration at high temperatures.

3 Claims, No Drawings

ETHANE AS A CHAIN TRANSFER AGENT FOR VINYLIDENE FLUORIDE POLYMERIZATION

This application claims priority from provisional application No. 60/268,528 filed Feb. 14, 2001.

BACKGROUND OF THE INVENTION

The emulsion polymerization at moderate pressure of vinylidene fluoride using fluorinated surfactant and, as a free-radical initiator, diisopropyl peroxydicarbonate (hereinafter referred to as IPP) is taught in U.S. Pat. No. 3,475,396 dated Oct. 28, 1969. The same patent teaches that the amount of fluorinated surfactant necessary in the system can be reduced if a chain transfer agent is present in the reaction system. The process was refined in U.S. Pat. No. 3,857,827 dated Dec. 31, 1974 wherein a particularly high molecular weight product was produced in a relatively fast reaction by the use of IPP initiator dissolved in a solution of acetone (the acetone acting as a chain transfer agent).

The process was further refined in U.S. Pat. No. 4,360,652 dated Nov. 23, 1982, which taught that high quality polymers were achieved when IPP (as an aqueous emulsion using a fluoroalkyl surfactant), isopropyl alcohol (hereinafter, IPA; used as the chain transfer agent) and monomer are added separately but simultaneously to an aqueous solution of the surfactant, either incrementally or continuously over the polymerization cycle.

In EP-387,938 vinylidene fluoride polymerization using peroxy disulfate as initiator and an alkyl acetate as a chain transfer agent (molecular weight regulator) is shown. Use of polar compounds as chain transfer agents introduces polar end-groups onto the molecular chains which causes the phenomenon of product discoloration and possibly cavities at the high temperatures encountered during the melt processing stage where the temperature can be in the vicinity of 550° F. (about 288° C.).

U.S. Pat. No. 4,569,978 disclosed the use of trichlorofluoromethane as a chain transfer agent to reduce or eliminate the discoloration and cavity formation phenomenon but this is an ozone depleting material and its use is being banned worldwide.

U.S. Pat. No. 5,473,030 proposes the substitution of 1,1,1-trifluoro 2,2-dichloroethane (HCFC-123) as a chain transfer agent to replace trichlorofluoromethane (CFC-11), but in practice this has not proven to be the answer, particularly to the discoloration problem.

U.S. Pat. No. 3,635,926 dated Jan. 18, 1972 discloses an aqueous process for making TFE/PVE copolymers in presence of chain transfer agents such as hydrogen and methane in combination with CFCs and HCFCs. In this patent only perfluoro-monomers (mainly TFE) were considered and methane was the most preferred chain transfer agent since it exhibited a reasonable chain transfer activity in the polymerization of perfluoro-monomers; however, high alkanes, including ethane were reported to be too active to be used in polymerization due to undesired (slowing) effect on polymerization rate.

EP 617058 demonstrates that combinations of branched aliphatic alcohols with lower alkanes in the polymerization of perfluoro-monomers (mainly TFE) were an effective chain regulator and improved melt flow index of perfluoropolymers.

In contrast to above disclosures regarding perfluorinated monomers, surprisingly, it has been found that the use of the hydrocarbon ethane as a chain transfer agent in the vinylidene fluoride polymerization process results, particularly in the case of vinylidene fluoride homopolymers, in a product which has a reduced tendency to generate cavities at the high temperatures encountered in typical forming processes and which has a greater tendency to resist discoloration at those same temperatures.

Addition of ethane to the polymerization of VF2 introduces a number of ethyl group chain terminations. The ethyl group is non-polar, inert, and not heat degradable and as a result the vinylidene fluoride polymers with such ethyl chain ends exhibit greater tendency to resist discoloration at the normal processing temperature of PVDF.

The introduction of hydrocarbons in general into any polymerization reaction is known to have an unpredictable effect. For any given reaction, any particular hydrocarbon may have no effect. In fluorocarbon polymer synthetic reactions it has always been thought that hydrocarbons would simply slow down the reaction rate to unacceptable levels even though the effect of hydrocarbons on vinylidene fluoride polymerizations has not been previously reported to applicants' knowledge. Neither has the fact that ethane is unique in being an efficient chain transfer agent been previously suggested. Still more surprisingly, in the present work, ethane has been shown to be about four times as efficient as trichlorofluoromethane. The initiator consumption is also independent of ethane concentration in the process and the need for any other chain transfer agent is eliminated. In the previously disclosed polymerization of perfluoromonomers where hydrocarbons were employed, more active chain transfer agents such as branched alcohol, chlorocarbons, etc., were present.

SUMMARY OF THE INVENTION

The invention provides in a first composition aspect, a vinylidene fluoride polymer containing at least some molecular chains having ethyl groups on at least one chain end.

The products of the first composition aspect of the invention, particularly vinylidene fluoride homopolymers, are light colored polymers which resist discoloration and cavitation at normal temperatures for extrusion or other fabrication techniques. Such products have the inherent applied use characteristics known for vinylidene fluoride polymers.

The invention provides in a first process aspect, a process for the preparation of vinylidene fluoride polymers, optionally in the presence of other fluorinated olefins, in an aqueous medium in the presence of a radical initiator and of ethane as a chain transfer agent.

Special mention is made of processes of the first process aspect of the invention wherein vinylidene fluoride homopolymer is produced. Special mention is also made of processes of the first process aspect of the invention wherein free radical initiators such as di(n-propyl) peroxydicarbonate or diisopropyl peroxydicarbonate are used.

DETAILED DESCRIPTION

The manner of practicing the invention will now be generally described with respect to a specific embodiment thereof, namely polyvinylidene fluoride based polymer prepared in aqueous emulsion polymerization.

The polymers are conveniently made by an emulsion polymerization process, but suspension and solution processes may also be used. In an emulsion polymerization process, a reactor is charged with deionized water, water-soluble surfactant capable of emulsifying the reactant mass during polymerization and paraffin antifoulant.

The mixture is stirred and deoxygenated. A predetermined amount of ethane is then introduced into the reactor, the reactor temperature raised to the desired level and vinylidene fluoride fed into the reactor. Once the initial charge of vinylidene fluoride is introduced and the pressure in the reactor has reached the desired level, an initiator emulsion is introduced to start the polymerization reaction. The temperature of the reaction can vary depending on the characteristics of the initiator used and one of skill in the art will know how to do so. Typically the temperature will be from about 60° to 120° C., preferably from about 70° to 110° C.

Similarly, the polymerization pressure may vary, but, typically it will be within the range 40 to 50 atmospheres. Following the initiation of the reaction, the vinylidene fluoride is continuously fed along with additional initiator to maintain the desired pressure. Once the desired amount of polymer has been reached in the reactor, the monomer feed will be stopped, but initiator feed is continued to consume residual monomer. Residual gases (containing unreacted monomer and ethane) are vented and the latex recovered from the reactor. The polymer may then be isolated from the latex by standard methods, such as, acid coagulation, freeze thaw or high shear.

Although the process of the invention has been generally illustrated with respect to the polymerization of vinylidene fluoride homopolymer, one of skill in the art will recognize that analogous polymerization techniques can be applied to the preparation of copolymers of vinylidene fluoride with coreactive monomers fluorinated or unfluorinated such as hexafluoropropylene and the like. Analogous techniques can also be applied using ethane as a chain transfer agent in the polymerization of other fluorinated polymers both homopolymers and copolymers, although the processes of U.S. Pat. No. 3,635,926 should be avoided.

When copolymerization of vinylidene fluoride and hexafluoropropylene are performed, or copolymerization of any two coreactive fluorinated monomers having differing reaction rates, the initial monomer charge ratio and the incremental monomer feed ratio during polymerization can be adjusted according to apparent reactivity ratios to avoid compositional drift in the final copolymer product.

Surfactants suitable for use in the polymerization are well known in the art and are typically water soluble halogenated surfactants, especially fluorinated surfactants such as the ammonium, substituted quaternary ammonium or alkali metal salts of perfluorinated or partially fluorinated alkyl carboxylates, the perfluorinated or partially fluorinated monoalkyl phosphate esters, perfluorinated or partially fluorinated alkyl ether or polyether carboxylates, the perfluorinated or partially fluorinated alkyl sulfonates, and the perfluorinated or partially fluorinated alkyl sulfates. Some specific, but not limiting examples are the salts of the acids described in the U.S. Pat. No. 2,559,752 of the formula X $(CF_2)_n$COOM, wherein X is hydrogen or fluorine, M is an alkali metal, ammonium, substituted ammonium (e.g., alkylamine of 1 to 4 carbon atoms), or quaternary ammonium ion, and n is an integer from 6 to 20; sulfuric acid esters of polyfluoroalkanols of the formula X $(CF_2)_n CH_2 OSO_3 M$, where X and M are as above; and salts of the acids of the formula $CF_3(CF_2)_n(CX_2)_m SO_3 M$, where X and M are as above; n is an integer from 3 to 7, and m is an integer from 0 to 2, such as in potassium perfluorooctyl sulfonate. The use of a microemulsion of perfluorinated polyether carboxylate in combination with neutral perfluoropolyether in vinylidene fluoride polymerization can be found in EP0816397AI and EP722882. The surfactant charge is from 0.05% to 2% by weight on the total monomer weight used, and most preferably the surfactant charge is from 0.1% to 0.2% by weight.

The paraffin antifoulant is optional, and any long-chain, saturated, hydrocarbon wax or oil may be used. Reactor loadings of the paraffin typically are from 0.01% to 0.3% by weight on the total monomer weight used.

The ethane may be added all at once at the beginning of the reaction, or it may be added in portions, or continuously throughout the course of the reaction. The amount of ethane added as a chain transfer agent and its mode of addition depends on the desired molecular weight characteristics.

The amount of ethane added depending on desired molecular weight may be from about 0.05% based on total monomer weight used, preferably from about 0.1% to about 5%. It has been found that substitution of methane for ethane shows no chain transfer effect in polyvinylidene fluoride polymerizations and substitution of propane and higher hydrocarbons significantly slows the polymerization rate to levels that are totally unacceptable for practical use.

The reaction can be started and maintained by the addition of any suitable initiator known for the polymerization of fluorinated monomers including inorganic peroxides, "redox" combinations of oxidizing and reducing agents, and organic peroxides. Examples of typical inorganic peroxides are the ammonium or alkali metal salts of persulfates, which have useful activity in the 65° C. to 105° C. temperature range. "Redox" systems can operate at even lower temperatures and examples include combinations of oxidants such as hydrogen peroxide, t-butyl hydroperoxide, cumene hydroperoxide, or persulfate, and reductants such as reduced metal salts, iron (II) salts being a particular example, optionally combined with activators such as sodium formaldehyde sulfoxylate, metabisulfite, or ascorbic acid. Among the organic peroxides which can be used for the polymerization are the classes of dialkyl peroxides, diacyl-peroxides, peroxyesters, and peroxydicarbonates. Exemplary of dialkyl peroxides is di-t-butyl peroxide, of peroxyesters are t-butyl peroxypivalate and t-amyl peroxypivalate, and of peroxydicarbonate, and di(n-propyl) peroxydicarbonate, diisopropyl peroxydicarbonate, di(sec-butyl) peroxydicarbonate, and di(2-ethylhexyl) peroxydicarbonate. The use of diisopropyl peroxydicarbonate for vinylidene fluoride polymerization and copolymerization with other fluorinated monomers is taught in U.S. Pat. No. 3,475,396 and its use in making vinylidene fluoride/hexafluoropropylene copolymers is further illustrated in U.S. Pat. No. 4,360,652. The use of di(n-propyl) peroxydicarbonate in vinylidene fluoride polymerizations is described in the Published Unexamined Application (Kokai) JP 58065711. The quantity of an initiator required for a polymerization is related to its activity and the temperature used for the polymerization. The total amount of initiator used is generally between 0.05% to 2.5% by weight on the total monomer weight used. Typically, sufficient initiator is added at the beginning to start the reaction and then additional initiator may be optionally added to maintain the polymerization at a convenient rate. The initiator may be added in pure form, in solution, in suspension, or in emulsion, depending upon the initiator chosen. As a particular example, peroxydicarbonates are conveniently added in the form of an aqueous emulsion.

The term "vinylidene fluoride polymer" used herein for brevity includes both normally solid, high molecular weight homopolymers and copolymers within its meaning. Such copolymers include those containing at least 50 mole percent of vinylidene fluoride copolymerized with at least one comonomer selected from the group consisting of tetrafluoroethylene, trifluoroethylene, chlorotrifluoroethylene, hexafluoropropene, vinyl fluoride, 3,3,3-trifluoropropene, and any other monomer that would readily copolymerize with vinylidene fluoride. Particularly preferred are copolymers composed of from at least about 70 and up to 99 mole percent vinylidene fluoride, and correspondingly from 1 to 30 percent tetrafluoroethylene, such as disclosed in British Patent No. 827,308; and about 70 to 99 percent vinylidene fluoride and 1 to 30 percent hexafluoropropene (see for example U.S. Pat. No. 3,178,399); and about 70 to 99 mole percent vinylidene fluoride and 1 to 30 mole percent trifluoroethylene. Terpolymers of vinylidene fluoride, hexafluoropropene and tetrafluoroethylene such as described in U.S. Pat. No. 2,968,649 and terpolymers of vinylidene fluoride, trifluoroethylene and tetrafluoroethylene are also representatives of the class of vinylidene fluoride copolymers which can be prepared by the process embodied herein.

The following Example is provided to further illustrate the best mode of practicing the invention and is not to be construed in limitation thereof.

EXAMPLE

Following the general procedure described above, polyvinylidene fluoride was polymerized in a horizontal reactor in a series of comparative runs using as a control a run where no ethane or other chain transfer agent was employed, varying amounts of ethane and as another control an amount of ethyl acetate (EA).

The results of these runs are shown in the Table.

In the Table, melt viscosity was determined by ASTM D3835 at the temperature and time indicated. Melting points were determined by Differential Scanning Colorimetry using ASTM 3418.

TABLE

Effects of ethane concentration on melt viscosity and melting temperature.

| Run No. | g of ethane/2000 g VF2 | Melt Viscosity @230° C. &100 s$^{-1}$ | Tm ° C. |
|---|---|---|---|
| 1 | 0 | 39.6 | 163.4 |
| 2 | 5.2 | 28.3 | 164.4 |
| 3 | 10.7 | 24.3 | 164.2 |
| 4 | 19.1 | 12.1 | 163.5 |
| 5 | 25.3 | 5.8 | 163.5 |
| 6 | 9.1 (EA) | 16.8 | 165.4 |

We claim:

1. A thermally initiated process for the preparation of vinylidene fluoride polymers in an aqueous medium in the presence of a free radical initiator and of a chain transfer agent consisting essentially of at least about 0.05%, based on the total weight of monomers polymerized, of ethane, optionally in the presence of other fluorinated olefins.

2. A process as defined in claim 1 wherein vinylidene fluoride homopolymer is prepared.

3. A vinylidene fluoride polymer as produced by claim 1 containing at least some molecular chains having ethyl groups on at least one chain end.

* * * * *